Figure 1:
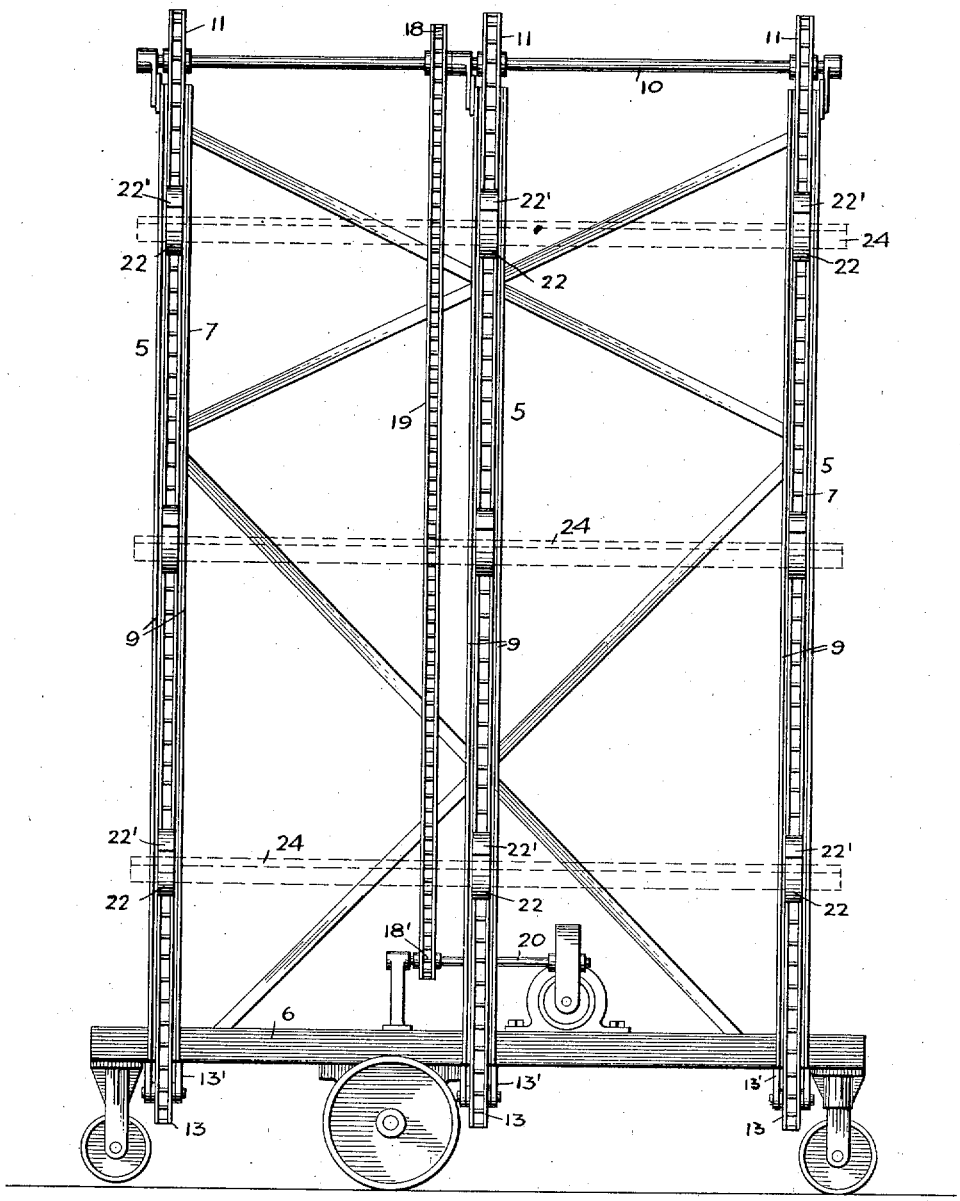

H. C. HILKE.

ELEVATOR.

APPLICATION FILED JAN. 27, 1914.

Reissued Apr. 18, 1916.

14,111.

2 SHEETS—SHEET 1.

WITNESSES

G. Robert Thomas

Rev. J. Hoster

INVENTOR

HENRY C. HILKE

BY Munn & Co

ATTORNEYS

H. C. HILKE.
ELEVATOR.
APPLICATION FILED JAN. 27, 1914.
Reissued Apr. 18, 1916.
14,111.
2 SHEETS—SHEET 2.
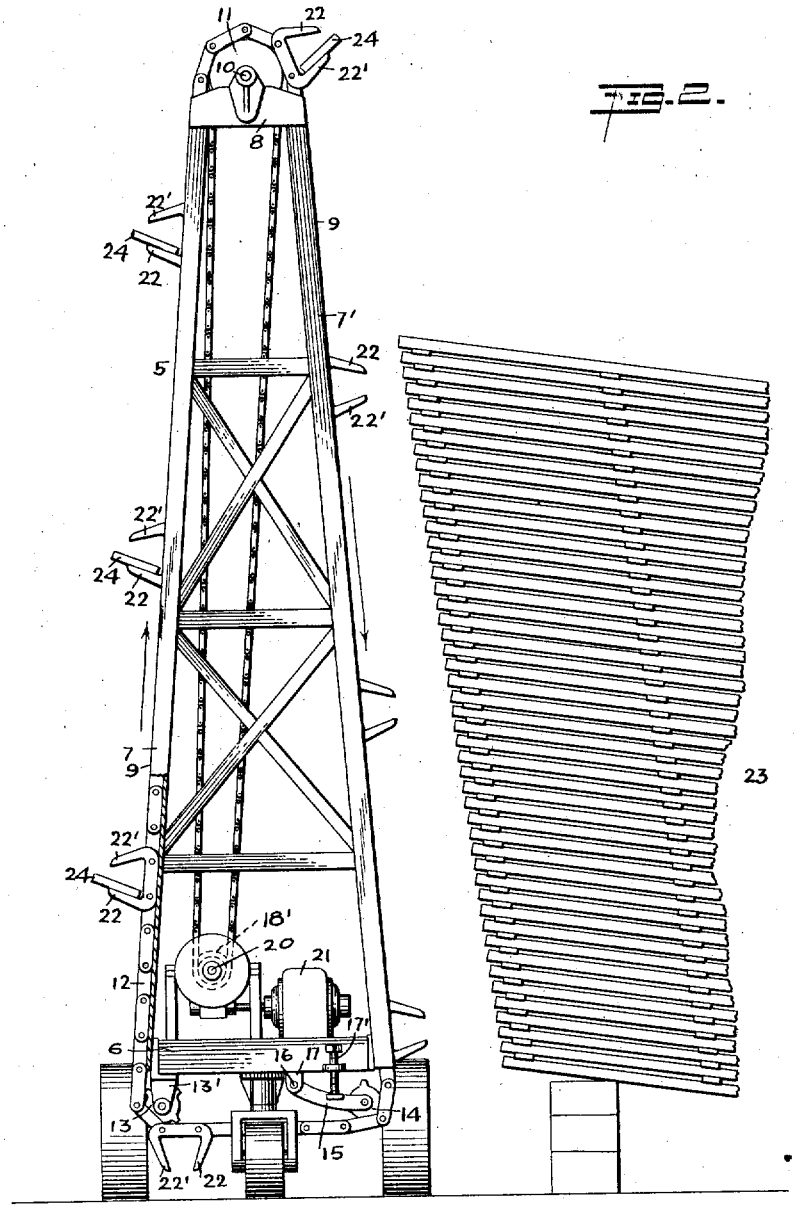
WITNESSES
G. Robert Thomas
Geo. J. Hoster
INVENTOR
HENRY C. HILKE
BY Munn & Co
ATTORNEYS
THE COLUMBIA PLANOGRAPH CO., WASHINGTON, D. C.

UNITED STATES PATENT OFFICE.

HENRY C. HILKE, OF SEATTLE, WASHINGTON.

ELEVATOR.

14,111. Specification of Reissued Letters Patent. Reissued Apr. 18, 1916.

Original No. 1,053,391, dated February 18, 1913, Serial No. 686,383. Application for reissue filed January 27, 1914. Serial No. 814,830.

*To all whom it may concern:*

Be it known that I, HENRY C. HILKE, a citizen of the United States, residing at Seattle, in the county of King and State of Washington, have invented certain new and useful Improvements in Elevators, of which the following is a full, clear, and exact description.

This invention relates to improvements in elevators and is especially designed for use in hoisting lumber to be piled in stacks, although it may advantageously be employed for loading upon railway cars or boats other articles such as long pieces of structural iron.

The invention consists in the novel construction and combination of parts as will be hereinafter described and claimed.

In the accompanying drawings, Figure 1 is a front elevation of a lumber elevator embodying my invention; and Fig. 2 is an end elevation of the same, part being shown in section.

The reference numerals 5 designate transversely-arranged A-shaped members of the elevator framework and which, as illustrated, are supported in spaced relations upon the platform 6 of a wheeled truck or car. Said frame members are each comprised of two posts 7 and 7′ secured at their lower ends to the car platform and inclined inwardly toward their upper ends which are rigidly connected by a coupling plate 8 provided for each of said frame members. The posts 7 and 7′ are formed of channel bars disposed to have the flanges 9 thereof directed outwardly.

Secured to the plates 8 are journal boxes for a longitudinal shaft 10 upon which are mounted sprocket wheels 11 for endless chains 12. These chains travel within the runways afforded between the flanges 9 of the respective frame posts. As illustrated in Fig. 2, said chains pass underneath of the car platform 6 and about guide wheels 13 and 14. The guide wheels 13 are mounted upon axles having their bearings in boxes 13′ which depend from said platform, while the other wheels 14 have their axles journaled in bearings provided in the free ends of arms 15 which are hingedly connected by pivotal pins 16 to hangers 17 secured to the said platform. Tightening screws 17′ screw in the platform 6 and bear down on the arms 15 to cause the guide wheels 14 to tighten the chains 12.

18 represents a sprocket wheel mounted upon the shaft 10 to receive a chain belt 19 which is driven by a sprocket wheel 18′ provided upon a counter-shaft 20 which, in turn, is driven by a power motor 21. Provided on said chains and arranged in the same relative positions thereon is a number of bracket attachments, or carriers, as they will hereinafter be designated. Each of these carriers is provided with two spaced arms 22 and 22′, and which are disposed to converge toward their outer ends and provide a dove-tail recess therebetween.

In operation, the elevator is positioned in front of a stack of lumber, as 23, Fig. 2, and the motor is actuated to drive the conveyers, which are constituted of the respective chains and the carriers thereof, in the direction indicated by arrows in the view. Pieces of lumber, as 24, for example, are placed upon the lower arms 22 of the horizontally alined carriers of the various chains as the same rise to a convenient height to be loaded by the attendants standing upon the ground. As a carrier progressively ascends a load is supported conjointly by the sloping arms 22 of the carriers and the flanges 9 of the adjacent posts 7, until the carriers travel above the top of these posts. The referred to load is then transferred by the chains over the wheels and thence lowered at the other side of the elevator whereupon the load bears against the flanges of the posts 7′. In passing over the sprocket whels 11, each load is canted or shifted from the carrier arms 22 to the other carrier arms 22′ and thus remains until the loaded carriers descend to an appropriate height for the attendants upon the stack to remove the stick or piece of lumber. By having the load supporting arms of the carriers inclined downwardly toward the frame when operative, the tendency of the load is to keep close to the frame, thus obviating any liability of the load falling from the carriers even when the conveyers are driven at a relatively high speed.

By reason of the loads being deposited upon the elevator at one side and removed from the other side of the same, it is apparent that the elevator may be operated close to a lumber pile and afford ample room for the attendants to conveniently handle the material.

From the foregoing it will be seen that the lumber is carried upward on the outer side of the elevator by the carrier arms 22 and the lumber automatically drops onto the carrier arms 22′ as soon as the lumber passes the top of the elevator, and the lumber is now carried downward by the carrier arms 22′ on the inner or stack side of the machine to any point between the top of the elevator and the ground thus requiring no adjustment or change in the position of the elevator, while the pile or stack of lumber grows gradually higher.

While I have described the invention as applied to the stacking of lumber, it may obviously be used in unstacking a pile of lumber, either by reversing the direction of motion of the conveyer chains or by turning the elevator around. When unstacking a pile of lumber the top pieces of lumber of the pile are successively loaded onto the adjacent bottom carrier arms and first carried upward by the said carrier arms on the inner or pile side of the elevator, then carried over the top of the elevator and dropped onto the lowermost carrier arms at the outer side of the elevator and then carried downward at the outer side of the elevator to be finally taken off the carrier arms by attendants standing on the ground at the outer side of the elevator.

What I claim is:

1. An elevator of the class described, comprising a wheeled truck having a platform, a frame rigidly secured to said platform and constituted of a plurality of A-shaped frame members, each frame member comprising two posts formed of channel bars, the posts being secured at their lower ends to the said platform and inclined inwardly toward their upper ends, a coupling plate for each frame member rigidly connecting the posts together at their upper ends, chain conveyers operating in the bar channels of the respective frame members, said conveyers including carrier attachments each having a body member moving in the bar channel and forming a link of the chain conveyer, and two spaced arms extending outward from the ends of the body member and converging toward their outer ends, a shaft supported by the said coupling plates at the upper ends of the frames, sprockets carried by said shaft over which said chains travel, a drive sprocket on the shaft, a power motor on the truck, and drive connections between the power motor and the drive sprocket on the shaft.

2. An elevator for stacking and unstacking lumber comprising a wheel supported platform, a frame erected on the said platform, sprocket wheels journaled on the top of the said frame, endless carrier chains passing around the said sprocket wheels, and provided with carrier attachments each having a body portion forming a part of said chain, and arms projecting outwardly from the ends of said body portion and extending beyond the sides of the said frame, the said arms converging toward their free ends, forming a dovetail recess between the arms for the reception of a piece of lumber, one of said arms supporting the piece of lumber during the ascent of the arms, and the other arm supporting the piece of lumber during the descent of said arms, and guide wheels for the carrier chains on the underside of the platform at opposite sides thereof.

3. In a machine for stacking and unstacking lumber, an endless carrier chain provided with carrier attachments each having a body portion forming part of said chain and a pair of carrier arms projecting outwardly from the ends of the body portion, the arms in each pair being spaced apart for the reception of a piece of lumber between the arms to support the piece of lumber on one arm during the ascent of the carrier arms and to support the piece of lumber on the other arm during the descent of the carrier arms, the said arms of each pair of arms having straight inner faces and being converging in an outward direction or toward their free ends forming a dovetail recess between the arms to safely hold the piece of lumber in position during the ascent and the descent of the carrier arms.

In testimony whereof I have signed my name to this specification in the presence of two subscribing witnesses.

HENRY C. HILKE.

Witnesses:
HERBERT E. PECK,
T. C. TIEDEMANN.

Copies of this patent may be obtained for five cents each, by addressing the "Commissioner of Patents, Washington, D. C."